United States Patent
Gustafsson

(10) Patent No.: US 6,517,952 B1
(45) Date of Patent: Feb. 11, 2003

(54) CONSTRUCTION MATERIAL FOR VEHICLES

(75) Inventor: Roland Gustafsson, Kullavik (SE)

(73) Assignee: HSSA Sweden AB, Trollhattan (SE)

( * ) Notice: Subject to any disclaimer, the term of this patent is extended or adjusted under 35 U.S.C. 154(b) by 0 days.

(21) Appl. No.: 09/214,333
(22) PCT Filed: Jul. 3, 1997
(86) PCT No.: PCT/SE97/01204
§ 371 (c)(1), (2), (4) Date: Jul. 19, 1999
(87) PCT Pub. No.: WO98/01295
PCT Pub. Date: Jan. 15, 1998

(30) Foreign Application Priority Data

Jul. 4, 1996 (SE) .............................. 9602637

(51) Int. Cl.$^7$ ................................. B32B 7/00
(52) U.S. Cl. ................. 428/608; 428/90; 428/292.1
(58) Field of Search ................ 428/608, 90, 292.1

(56) References Cited

U.S. PATENT DOCUMENTS 3,697,238 A * 10/1972 Brown et al. .............. 428/608
5,424,139 A *  6/1995 Shuler et al. .............. 428/596

FOREIGN PATENT DOCUMENTS

| EP | 0 333 685 A2 | 9/1989 |
| GB | 2 222 379 A | 3/1990 |
| JP | 08303978 | * 11/1996 |

OTHER PUBLICATIONS

Dialog Information Services, File 351, Dialog accession No. 10669493, WPI accession No. 96–166447/17, Abiko T: "Electrostatic piling of metallic pile fibres—by forming electric field between base material and high voltage electrode and feeding fibre pile onto base material"; & JP,A, 8047663, 960220, 9617 (Basic), Abstract.

Dialog Information Services, File 350, Dialog accession No. 002013596, WPI accession No. 78–26623A/14, Anonymous: "Flame protection barrier with heat–stable fibre pile—attached directly to article or to heat–stable sheet"; & RD,A,167061, 780220, 7814 (Basic).

Patent Abstracts of Japan, vol. 172, No. 22, M–1404, abstract of JP,A,40–59073 (Toraya Uuru KK), Feb. 25, 1992.

Patent Abstracts of Japan, vol. 152, No. 49, M–1128, abstracts of JP,A,30–81065 (Tokyo Seiko Co. Ltd), Apr. 5, 1991.

* cited by examiner

Primary Examiner—Elizabeth M. Cole
(74) Attorney, Agent, or Firm—Howrey Simon Arnold & White LLP

(57) ABSTRACT

The present invention relates to a construction material for vehicles which material consists of a formable sandwich material which comprises at least two plates (1, 2) with intermediate fibres (5) which are arranged on at least one of the plates (2) by means of electrostatic deposition and the invention whereby the fibres (5) consist of metallic material.

20 Claims, 1 Drawing Sheet

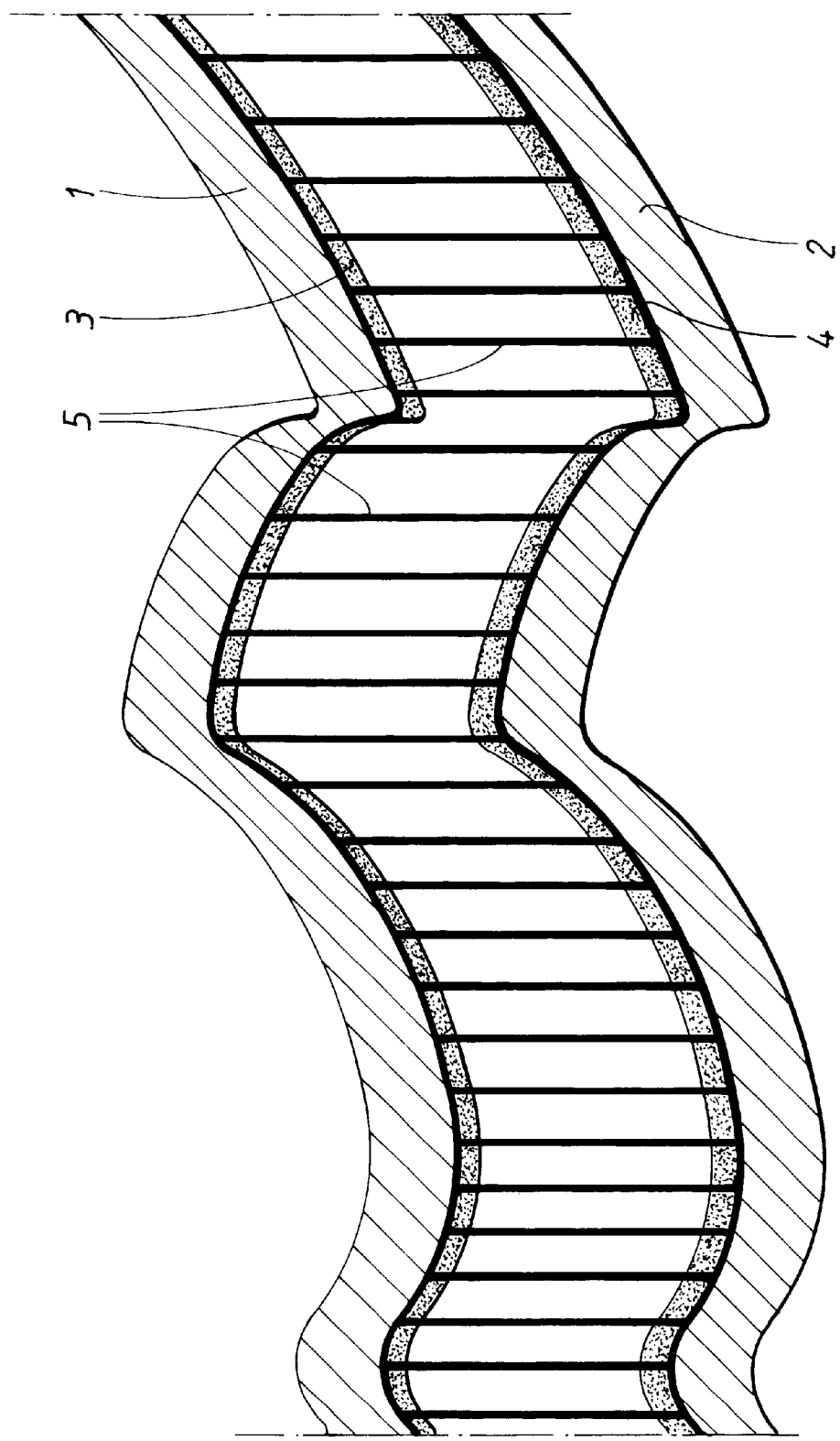

CONSTRUCTION MATERIAL FOR VEHICLES

This is a 371 of PCT/SE97/01204 filed Jul. 3, 1997.

FIELD OF THE INVENTION

The present invention relates to a construction material for vehicles consisting of a formable sandwich material. More particularly, the present invention relates to such construction material of the type with at least two plates, at least one of which has been covered with fiber flocks by electrostatic deposition on that surface facing the second plate. Accordingly, the material consists of two plates with intermediate fibers which are generally perpendicular to the plates, and which have been fastened to the plates by means of a binder on each plate.

BACKGROUND OF THE INVENTION

A considerable number of different types of sandwich materials are known. They typically consist of two sheets or plates between which are arranged material of a softer type. The sheets or plates may be comprised of the same or different material, and the material between them may be homogeneous or composite. The sandwich materials are often rigid and strong compared to their weight and are used, inter alia, as building materials, packing materials and the like.

A specific type of sandwich material is described in European Patent No. 333,685. In this material plates of steel, aluminum or the like which are electrically conductive are used as the outer material, whereas the material between them consists of fibers which have been arranged by electrostatic deposition, known as flocking. Before the flocking is carried out, the fibers are cut into suitable lengths having a size in the order of 1 mm, and are introduced into an electrical field thereby becoming electrically charged and attracted by a plate which is preferably grounded. On this grounded plate a binder has been applied, and when the fibers, through the electrostatic field, are rapidly attracted to the plate, they land thereon in an to the plate they land thereon in an upright position and are fastened in the binder. The binder is finally cured and the velvet-like surface which consists of fibres is cleaned of fibres which have not fastened. According to this patent, two plates may be covered with fibre flock and pressed against each other so that the fibres penetrate in between each other. To attach the plates to each other strips or patches of glue may be applied on some of the flocked surfaces. However, according to the patent only one plate may be flocked, with the result that it will be necessary to apply a film of binder on the other plate to hold the sandwich material together.

This sandwich material is made up of electrically conductive plates such as aluminium, steel or the like or some other electrically non-conductive material such as plastic sheets. However, the intermediate flock consists of electrically non-conductive material such as nylon fibres.

This laminate or sandwich material can be formed in different ways without breaking. The material is very light compared to its thickness and has a great mechanical strength.

Technical Problem

The above-mentioned and other known sandwich materials have many advantages but they nevertheless have the disadvantage that a substantial part of the composition consists of organic materials, which means that the material is not suitable for high temperatures especially during longer periods. Nylon fibres or other suitable polymer fibres melt at around 100° C. and therefore this material must be used at substantially lower temperatures in order to maintain its properties. This limits the application area of this material. For example, it cannot be used for such details on cars which have to be painted since the painting occurs at temperatures of 200–300° C. A further problem with the known materials is that they are not environmental friendly since they are composed of different materials.

Solution

It has therefore long been a desire to bring about a sandwich construction material as a construction material in vehicles which is light, is formable, has suitable mechanical properties such as rigidity and elasticity and which above all can resist high temperatures. According to the present invention, there has therefore been brought about a formable sandwich material comprising at least two plates at least one of which is covered by fibres on that side which faces the second plate or alternatively on both sides by means of electrostatic deposition, known as flocking, and which includes the fibres substantially consisting of metallic material.

According to the invention, it is suitable that the fibres consist of stainless steel, aluminium or some other metal or alloys.

The plates in the sandwich material can, according to the invention, be made of the same material as the fibres or of some other metallic material.

According to the invention, it is suitable that the material both in the plates and the fibres consists of stainless steel and that the thickness of the plates lies between 0.4–0.05 mm and the length of the fibres between 1–3 mm and their thickness between 8–30 micrometers.

The thickness of the aluminium fibres may be between 30–50 micrometers.

According to the invention, both the plates may be covered with fibres on that side which faces the other plate.

According to the invention, it is also possible that only one plate is covered with fibres whereas the other plate is provided with a thin layer of an adhesive.

According to the invention, the sandwich material may comprise more than two plates with intermediate flocks.

The sandwich material according to the present invention is suitable for use as a construction material in vehicles, preferably as a bonnet, boot lid, roof (hard top), sound-absorbing plates, etc.

If the material according to the present invention is used as a roof on a car, it may suitably be flocked also on that surface of the laminate which faces inwardly into the vehicle.

If, as according to the above, the material is used as a roof on a vehicle, such as for example, a private car and the material comprises stainless steel, that side of the roof which faces outwardly can be free from paint and instead be polished or embossed in a suitable pattern.

DESCRIPTION OF THE FIGURES

The invention will in the following be described more in detail in connection with the attached drawing which shows a section through the formable sandwich material according to the present invention.

DETAILED DESCRIPTION

The FIGURE shows a section through a formed part of the material according to the invention. The material consists of two outer plates 1 and 2 which suitably may consist of steel, aluminium or some other metallic material. Even if these plates 1 and 2 suitably consist of this material, the invention also comprises other material having sufficient strength and formability, for example some plastic material. The plates 1 and 2 do not need to be of the same material. If they consist of stainless steel, a thickness of the plates of 0.2 mm is suitable, which gives good formability. They may, however, be appreciably thinner or thicker, for example from 0.05 mm up to 0.4 mm. On the inner side of the plates towards the laminate a thing film 3 and 4 of an adhesive has been arranged. These adhesive films 3 and 4 keep the laminate together, which in its interior consists of metallic fibres 5.

During manufacture of the sandwich material firstly one of the plates has been covered with an adhesive whereupon the metal fibres 5 have been flocked on this plate. After hardening of the binder the second plate has then been applied on the tops of the upright standing metal fibres 5 with its binder-provided surface. Since the fibres 5 have been applied by means of a flocking method when they have accelerated down to the surface by the electrostatic field, they will maintain the upright standing position compared to the support. The support is usually earthed and the fibres are given a positive charge in the electrostatic field. When the fibres come down to the support they are discharged and they will therefore not be a hindrance to the following charged fibres. The fibres can therefore be put very close to each other. The adhesive into which the fibres are allowed to be fastened may be of different kinds, but an epoxy glue is preferred in most cases. Even though the fibres consist of metallic material, the invention also comprises admixing of fibres of different materials.

When one of the plates, for example plate 2, has been covered with flock and the binder has been cured, the other plate 1 covered with a film 3 consisting of binder is arranged on the protruding ends of the fibres. After curing of the binder 3 on the last arranged plate 1 the sandwich material is completed and can be formed to different configurations, for example by cold pressing.

If a laminate material consisting of several plates is wanted, then an already flocked plate may be applied on the outer side of the laminate shown in the figure, which laminate then must be provided with an adhesive layer and pressed to this. It is, of course, also possible to flock the sandwich material shown in the figure on one or two further sides and, if so desired, to arrange more plates on the later flockings.

As said above, different materials may be included in the sandwich material according to the invention, but from an environmental point of view it is suitable that the same material is used both for the fibres and the plate material. This facilitates the reuse of the material as, when melted, the melt will be homogeneous. On the other hand, an alloy which derives from use of different materials in the sandwich material may also be used for different purposes. When the material is melted, the organic material which is present in the binder will dissipate as combustion gases.

The density of fibres on the plate may vary between 10–30 fibres/mm$^2$, but a number of 25–30 fibres/mm$^2$ is preferred for a thickness of 8 micrometers. The weight of the fibres in the material may suitably be 245 g/m$^2$–350 g/m$^2$. For fibre thicknesses of about 30 micrometers a suitable fibre density will be between 3–10 fibres/mm$^2$.

The sandwich material according to the present invention may be varied within certain limits. If a higher rigidity of the material is desired, a thin plate and relatively many fibres may be used, whereas if a more elastic material is desired, a thicker plate and a smaller amount of fibres may be used. The variations in the thickness of the plates are small and vary within a few tenths of a millimeter. The material is usually six to eight times stiffer than conventional plate material having the same weight, which gives substantial construction advantages. The weight of the material according to the present invention will be less than half, compared to conventional plate material of the same thickness.

The low weight, high stiffness and temperature resistency make the material according to the present invention especially suitable for use as body parts on vehicles, such as cars. As an example, it may be mentioned that a releasable roof of a private car, known as hard top, which today usually is usually produced of SMC material (glass fibre-reinforced polyester) weighs today about 33 kg, whereas the same hard top with the material according to the present invention weighs 10–12 kg. These releasable hard tops can with this higher weight be removed or replaced only by means of two persons, whereas with the material according to the present invention it suffices with only one person.

If the material according to the present invention is used for a so-called hard top, it can also be flocked on that side which faces the compartment so that there is no need for further cloth covering or other decoration of the inner side of the roof. This also makes it possible to paint the roof at high temperatures, which is usual for car paint, without damaging the fibres. However, if stainless steel is used the painting may be dispensed with on the outer side of the roof and it is instead possible to grind or impress it to suitable pattern.

The material according to the present invention is also sound-absorbing. It may therefore be used as sound-absorbing plates which are present especially in large vehicles in the vicinity of the engine or as a bonnet over a conventional engine in a private car. It may also be used as a casing over the engine itself.

Due to the light weight and the high rigidity, the material is very suitable to be used as a boot lid on private cars or other cars. Both the rigidity and the elasticity can, as mentioned above, be varied for different kinds of cars and for different use.

According to the present invention, a material has been brought about which is very light compared to a corresponding material of conventional type and which requires fewer parts, which means reduced tool costs and shorter time from design to production. The material can also be varied with regard to stiffness, elasticity and strength.

The invention is not limited to the embodiment shown but can be varied in different ways within the scope of the claims.

What is claimed is:

1. Construction material comprising:
   a first metal plate having a first surface,
   a second metal plate having a first surface,
   said first surface of said first plate facing said first surface of said second plate, and
   a plurality of fibers applied to a layer of adhesive on at least one of said first surfaces of said first and second plates,
   said plurality of fibers substantially comprising metallic fibers.
2. Construction material comprising:
   a first metal plate having a first surface,
   a second metal plate having a first surface,
   said first surface of said first plate facing said first surface of said second plate, and a plurality of fibers applied by flocking to a layer of adhesive on at least one of said first surfaces of said first and second plates, said plurality of fibers substantially comprising metallic fibers.

3. The construction material of claim 1 wherein said plurality of fibers are also applied to said other of said first surfaces of said first and second plates.

4. The construction material of claim 1 wherein said plurality of fibers are applied to said at least one of said first surfaces of said first and second plates by means of electrostatic deposition.

5. The construction material of claim 1 wherein said plurality of fibers is selected from the group consisting of stainless steel, aluminum, metal alloys and mixtures thereof.

6. The construction material of claim 1 wherein said first and second plates comprise a metal.

7. The construction material of claim 6 wherein said metal of said first and second plates comprises the same metal as said metal of said metallic fibers.

8. The construction material of claim 7 wherein said metal comprises stainless steel.

9. The construction material of claim 8 wherein said first and second plates have a thickness of between about 0.4 and 0.05 mm.

10. The construction material of claim 9 wherein said plurality of fibers have a length of between about 1 and 3 mm.

11. The construction material of claim 10 wherein said plurality of fibers have a thickness of between about 8 and 30 micrometers.

12. The construction material of claim 5 wherein said plurality of fibers comprise aluminum.

13. The construction material of claim 12 wherein said plurality of fibers have a length of between about 1 and 3 mm.

14. The construction material of claim 13 wherein said plurality of fibers have a thickness of between about 30 and 50 micrometers.

15. The construction material of claim 1 wherein said other of said at least one of said first surfaces of said first and second plates includes a layer of adhesive thereon.

16. The construction material of claim 1 including at least a third plate and including intermediate flock material disposed between said at least one third plate and one of said first and second plates.

17. The construction material of claim 1 wherein said construction material comprises a product selected from the group consisting of a vehicle hood, vehicle hood lid, and the roof of said vehicle.

18. The construction material of claim 1 wherein said construction material comprises a product comprising a portion of a compartment of a car, including an inwardly facing side and an outwardly facing side, and including flocked material disposed on said inwardly facing side of said product.

19. The construction material of claim 18 wherein said product comprises the roof of said car.

20. The construction material of claim 19 wherein said roof comprises an inwardly facing side and an outwardly facing side, said construction material comprising stainless steel, and said outwardly facing side of said roof being polished or embossed.

\* \* \* \* \*